US008238915B2

(12) United States Patent
Hazzani

(10) Patent No.: US 8,238,915 B2
(45) Date of Patent: Aug. 7, 2012

(54) SYSTEMS AND METHODS FOR LOCATING COMMUNICATION TERMINALS IN CELLULAR NETWORKS

(75) Inventor: Gideon Hazzani, Rishon le Zion (IL)

(73) Assignee: Verint Americas, Inc., Roswell, GA (US)

( * ) Notice: Subject to any disclaimer, the term of this patent is extended or adjusted under 35 U.S.C. 154(b) by 55 days.

(21) Appl. No.: 12/840,233

(22) Filed: Jul. 20, 2010

(65) Prior Publication Data

US 2011/0028162 A1    Feb. 3, 2011

(30) Foreign Application Priority Data

Jul. 30, 2009    (IL) ........................................ 200158

(51) Int. Cl.
*H04W 88/02* (2009.01)
(52) U.S. Cl. ........................................................ 455/436
(58) Field of Classification Search ............ 455/436–446
See application file for complete search history.

(56) References Cited

U.S. PATENT DOCUMENTS

| 6,952,181 | B2 * | 10/2005 | Karr et al. | 342/457 |
| 2003/0222820 | A1 * | 12/2003 | Karr et al. | 342/457 |
| 2005/0239478 | A1 | 10/2005 | Spirito | |
| 2008/0167049 | A1 * | 7/2008 | Karr et al. | 455/456.2 |

FOREIGN PATENT DOCUMENTS

| WO | 03009613 | A1 | 1/2003 |
| WO | 2006044291 | A2 | 4/2006 |
| WO | 2010116292 | A2 | 10/2010 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Strobel, Daehyun, "IMSI Catcher," Seminararbeit Ruhr-Universität Bochum, Chair for Communication Security, Prof. Dr.-Ing. Christof Paar, Jul. 13, 2007, 28 pages.
Meyer, Ulrike, et al., "On the Impact of GSM Encryption and Man-in-the-Middle Attacks on the Security of Interoperating GSM/UMTS Networks," IEEE, 2004, 8 pages.
Extended European Search Report, dated Nov. 11, 2010, received from the European Patent Office in connection with EP10170566.

* cited by examiner

*Primary Examiner* — Diane Mizrahi
(74) *Attorney, Agent, or Firm* — McKeon, Meunier Carlin & Curfman

(57) ABSTRACT

Methods and systems in a wireless communication network for determining respective distances between a given base transceiver station and one or more other base transceiver stations. An effective location of the given base transceiver station may be calculated that is different from its physical location. The effective location may be use to report an estimated location of a communication terminal communicating with the given base transceiver station. The estimated location may be provided in networks that support both a hard handover or soft handover of the communication terminal between the given base transceiver station and the one or more other base transceiver stations.

14 Claims, 11 Drawing Sheets

SYSTEMS AND METHODS FOR LOCATING COMMUNICATION TERMINALS IN CELLULAR NETWORKS

FIELD OF THE DISCLOSURE

The present disclosure relates generally to cellular communication networks, and particularly to methods and systems for locating mobile communication terminals in a cellular network.

BACKGROUND OF THE DISCLOSURE

Cellular communication networks use various techniques for measuring the locations of mobile communication terminals operating in the networks. Such techniques are used, for example, for providing Location Based Services (LBS) and emergency services in the cellular networks. Some location techniques are passive, i.e., determine the terminal's location by monitoring events generated in the cellular network. Other techniques are active, i.e., proactively request the network or the terminal to provide location information. Both the passive and the active techniques typically require extra equipment to be installed in the network, for example to measure the signal times or to interrogate the network or terminal.

SUMMARY OF THE DISCLOSURE

An embodiment that is described herein provides a method, including:

in a wireless communication network, determining respective distances between a given base transceiver station and one or more other base transceiver stations;

calculating, responsively to the distances, an effective location of the given base transceiver station that is different from a physical location of the given base transceiver station; and reporting the effective location as an estimated location of a communication terminal communicating with the given base transceiver station.

In some embodiments, the given base transceiver station is operative in a given coverage region, and the one or more other base transceiver stations are operative in respective other coverage regions which at least partially overlap the given coverage region. In an embodiment, calculating the effective location includes determining an average of the distances and calculating the effective location in response to the average. In a disclosed embodiment, the given base transceiver station is operative in a sector of a circle, and calculating the effective location includes determining a bisector of the sector and positioning the effective location to lie on the bisector. Positioning the effective location may include determining a position for the effective location in response to the average.

In an embodiment, determining the average includes weighting the average in response to respective parameters associated with the given base transceiver station and the one or more other base transceiver stations. The respective parameters may include a mean transmission power level and/or an amount of overlap between a given coverage region of the given base transceiver station and a coverage region of the one or more other base stations. In another embodiment, determining the average includes progressively adding to the one or more other base transceiver stations until a preset number thereof is reached.

In some embodiments, the given base transceiver station is operative in a coverage region, and the method includes reporting an expected terminal operating region as a sub-region of the coverage region. The sub-region may include a conic section. In an embodiment, the coverage region includes a sector having as bounds two radii of a circle, and the conic section is tangential to the two radii.

In some embodiments, the wireless communication network only supports a hard handover of the communication terminal between the given base transceiver station and the one or more other base transceiver stations. In an alternative embodiment, the wireless communication network supports a soft handover of the communication terminal between the given base transceiver station and the one or more other base transceiver stations, and the given base transceiver station includes two or more base transceiver stations communicating simultaneously with the communication terminal, each of the two or more base transceiver stations having respective effective locations different from respective physical locations thereof, and the method includes reporting the estimated location of the communication terminal as a function of the respective effective locations. The function may include a centroid of the respective effective locations. In an embodiment, the method includes reporting an expected terminal operating region as a conic section enclosing the estimated location.

There is additionally provided, in accordance with an embodiment that is described herein, apparatus, including:

a memory, which is configured to store parameters of base transceiver stations operative in a wireless communication network; and a processor which is configured to:

determine respective distances between a given base transceiver station and one or more other base transceiver stations operative in the wireless communication network, calculate, responsively to the distances, an effective location of the given base transceiver station that is different from a physical location of the given base transceiver station, and report the effective location as an estimated location of a communication terminal communicating with the given base transceiver station.

There is also provided, in accordance with an embodiment that is described herein, a computer software product for locating a communication terminal, the product including a computer-readable medium having program instructions recorded therein, which instructions, when read by a computer, cause the computer to:

determine respective distances between a given base transceiver station and one or more other base transceiver stations operative in a wireless communication network;

calculate, responsively to the distances, an effective location of the given base transceiver station that is different from a physical location of the given base transceiver station; and report the effective location as an estimated location of the communication terminal communicating with the given base transceiver station.

The present disclosure will be more fully understood from the following detailed description of the embodiments thereof, taken together with the drawings. A brief description of the drawings follows.

DETAILED DESCRIPTION OF EMBODIMENTS

Overview

Figure 1:
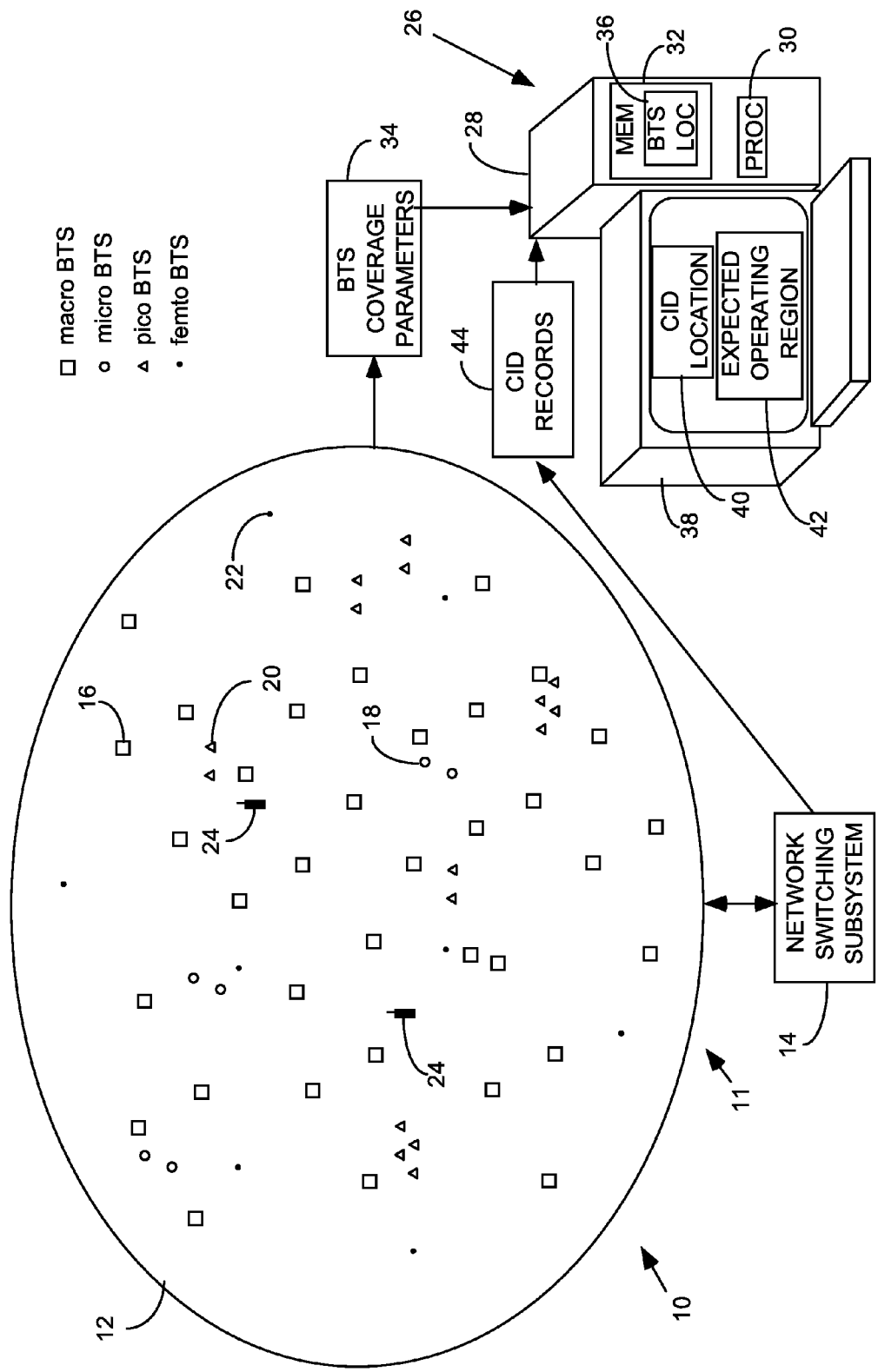
FIG. 1 is a diagram schematically illustrating a terminal location system operating in a cellular communication network, according to an embodiment of the present disclosure.

A typical cellular network comprises many, usually hundreds or even thousands, of base transceiver stations (BTSs). At any given time, the location of a particular mobile terminal operating in the network may be determined, to a first approximation, as being equivalent to the actual location of the BTS with which the mobile is communicating. This technique is commonly referred to as cell identification (CID). Such a first approximation, however, is often extremely rough, especially for BTSs having relatively large radiation coverage regions. Large radiation coverage region BTSs are referred to herein as macro-BTSs (as distinct from micro, pico, or femto BTSs).

Embodiments described herein improve significantly on the first approximation for macro-BTSs, by finding and reporting a virtual location for each of these BTSs. The virtual location, which is reported instead of the actual BTS location, provides a significantly better measure of the location of a terminal communicating with the macro-BTS than the actual macro-BTS location.

A macro-BTS typically has a coverage region in the shape of a sector of a circle. (A macro-BTS often covers multiple cells, each having a respective sector-shaped coverage region. In the present context, however, each such cell is regarded as a separate BTS.) Typically, there is at least some overlap between the sectors of different macro-BTSs. Thus a specific macro-BTS, herein termed the serving BTS, usually has a number of neighboring macro-BTSs whose coverage regions overlap the coverage region of the serving BTS.

Where there is a large overlap from one or more neighboring BTSs, the terminal is more likely to be in close proximity to the serving BTS (since terminals located further away from the serving BTS are more likely to hand-off to a neighboring BTS). Where there is little or no overlap, it is reasonable to assume that the terminal can be located anywhere within the coverage region of the serving BTS. The methods and systems described herein use this principle to estimate the location of mobile terminals with improved accuracy.

In one embodiment, to determine the virtual location of the serving BTS, an average distance to a preselected number of the neighboring macro-BTSs which have sectors overlapping the serving BTS's sector is calculated. The virtual location of the serving BTS is assumed to lie on the bisector of the sector-shaped coverage region of the serving BTS, distanced a predetermined fraction of the calculated average distance.

In an embodiment, virtual locations of various macro-BTSs (often all macro-BTSs) in the network are determined as described above, and these virtual locations, rather than the actual physical locations, are used when reporting the location of a mobile terminal operating in the network. Since the reported virtual locations take into account the effect of neighboring BTSs, the disclosed techniques estimate terminal locations with improved accuracy.

For a typical cellular network, the accuracy improvement is on the order of 40% to 50% in comparison with known CID techniques. This improvement is achieved without a need for additional location infrastructure in the cellular network or in the terminals. The disclosed techniques are particularly effective in cellular networks deployed in dense suburban and urban areas, but may nevertheless be applied in various other networks and environments.

System Description

FIG. 1 is a diagram schematically illustrating a terminal location system 10 operating in a cellular communication network 11, according to an embodiment of the present disclosure. Network 11 may operate in accordance with any suitable communication standard or protocol, such as Universal Mobile Telecommunication System (UMTS), Long Term Evolution (LTE), CDMA2000 or other third generation (3G) cellular standard, Global System for Mobile communication (GSM), or Integrated Digital Enhanced Network (IDEN). Alternatively, the networks and terminals may conform to the IEEE 802.16 (WiMAX) standards or other wireless data standard.

Network 11 comprises different types of base transceiver stations (BTSs), the different types being classified according to the coverage and communication capacity of the BTS. The BTSs are assumed to be located in a geographical region 12, and the network is operated by a Network Switching Subsystem (NSS) 14 which typically includes, inter alia, one or more Mobile Switching Centers (MSCs). For simplicity, in FIG. 1 the MSCs and other elements required to operate network 11, such as Base Station Controllers (BSCs), are not shown.

Also operating in region 12 are mobile terminals 24. Terminals 24 act as mobile transceivers transmitting signals to, and receiving signals from, the BTSs, so as to communicate with each other and with other telecommunication equipment.

Each BTS in region 12 has a respective antenna system which provides each BTS in network 11 with a respective radiation coverage region. The coverage region for a given BTS is the region wherein mobile terminals 24 are able to communicate with that BTS.

In region 12 there are assumed to be four different types of BTS which are listed here in descending order of coverage and capacity: macro-BTSs 16, micro-BTSs 18, pico-BTSs 20, and femto-BTSs 22. As necessary, in the description herein the different BTSs are differentiated by appending a positive integer subscript 1, 2, . . . , i, . . . , n, . . . to the numerical identifier. Typically, the capacity of a BTS, its coverage region, and a maximum distance at which it is able to communicate with mobile terminals are directly related, so that, by way of example, in the present disclosure the four different types of BTS are classified according to a maximum operating distance from its antenna system of each BTS. Thus, in one embodiment of the present disclosure femto-BTSs, pico-BTSs, and micro-BTSs are assumed to have respective maximum operating distances of 12 m, 25 m, and 50 m. In the present disclosure, macro-BTSs are assumed to have maximum operating distances greater than 50 m. The maximum operating distance of a macro-BTS may be on the order of 1 km and up to several km.

It will be understood that the classifications of BTSs described hereinabove, into four categories using specific numerical values for maximum operating distances, are arbitrary, and that any other convenient categorization and numerical values may be used. Furthermore, rather than classifying the BTSs according to their maximum operating distance, they may be classified by any other convenient measure, such as a number of mobile terminals a BTS is able to communicate with simultaneously. Such measures will be apparent to those having ordinary skill in the art, and are assumed to be comprised within the scope of the present disclosure. Regardless of the type of classification of the BTSs, and as will be apparent from the description herein, embodiments according to the present disclosure are able to operate with substantially any type of BTS.

By way of example, in the following description BTSs are also divided into two categories: a first category wherein a reported location of the BTS is assumed to correspond to the physical location of the antenna system of the BTS, and a second category, wherein the reported location of the BTS, herein termed a virtual location, is different from the physical location of the BTS's antenna system. In one example embodiment, BTSs which have a substantially omnidirectional radiation coverage area are assumed to be in the first category, and such BTSs typically comprise femto-BTSs, pico-BTSs, and some micro-BTSs and macro-BTSs. BTSs which have a directional radiation coverage area are assumed to be in the second category, and such BTSs typically comprise micro-BTSs and macro-BTSs that are not in the first category. Hereinbelow the two categories are also termed an omnidirectional category and a directional category.

Embodiments of the present disclosure estimate and report the location of mobile terminals 24 operating in network 11, using a mobile location determining server 26. Server 26 typically comprises a computer 28, which includes a processor 30 and a memory 32.

As is described in more detail below, in system 10 processor 30 initially determines respective effective locations 36 for each BTS operating in network 11, using BTS coverage parameters 34. The effective location of a BTS is either the physical location or the virtual location of the BTS, depending on whether the BTS is assigned to the first or second category described above. The effective locations of the BTSs, as well as their coverage parameters, are stored in memory 32.

In order to locate mobile terminals 24, server 26 receives cell identification (CID) records 44 of the terminals operating in network 11 from NSS 14. The CID records include a unique identification number of each terminal 24 as well as an identification of the serving BTS, i.e., the BTS with which the terminal is communicating at the time the record is generated. For a particular terminal, processor 30 reports the effective location of the serving BTS as the estimated location of the terminal, and presents this location on an output device (e.g., a monitor 38) of server 26 as a CID location 40. CID location 40 may be presented on the monitor in numerical and/or graphical form.

Typically, a region 42 proximate to the required location is also delineated, graphically and/or numerically, on monitor 38. The delineated region corresponds to a region close to the serving BTS wherein a terminal communicating with the BTS has a high probability of being present. The delineated region (which often has the shape of a circle or ellipse surrounding the reported effective location) is also herein termed the expected terminal operating region of the BTS. As is explained in more detail below, the expected terminal operating region of a particular BTS may correspond to the coverage region of the BTS, or may be a subset of the coverage region.

The configuration of FIG. 1 is an example configuration, which is chosen purely for the sake of conceptual clarity. In alternative embodiments, any other suitable configuration can also be used. Typically, processor 30 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

Figure 2:
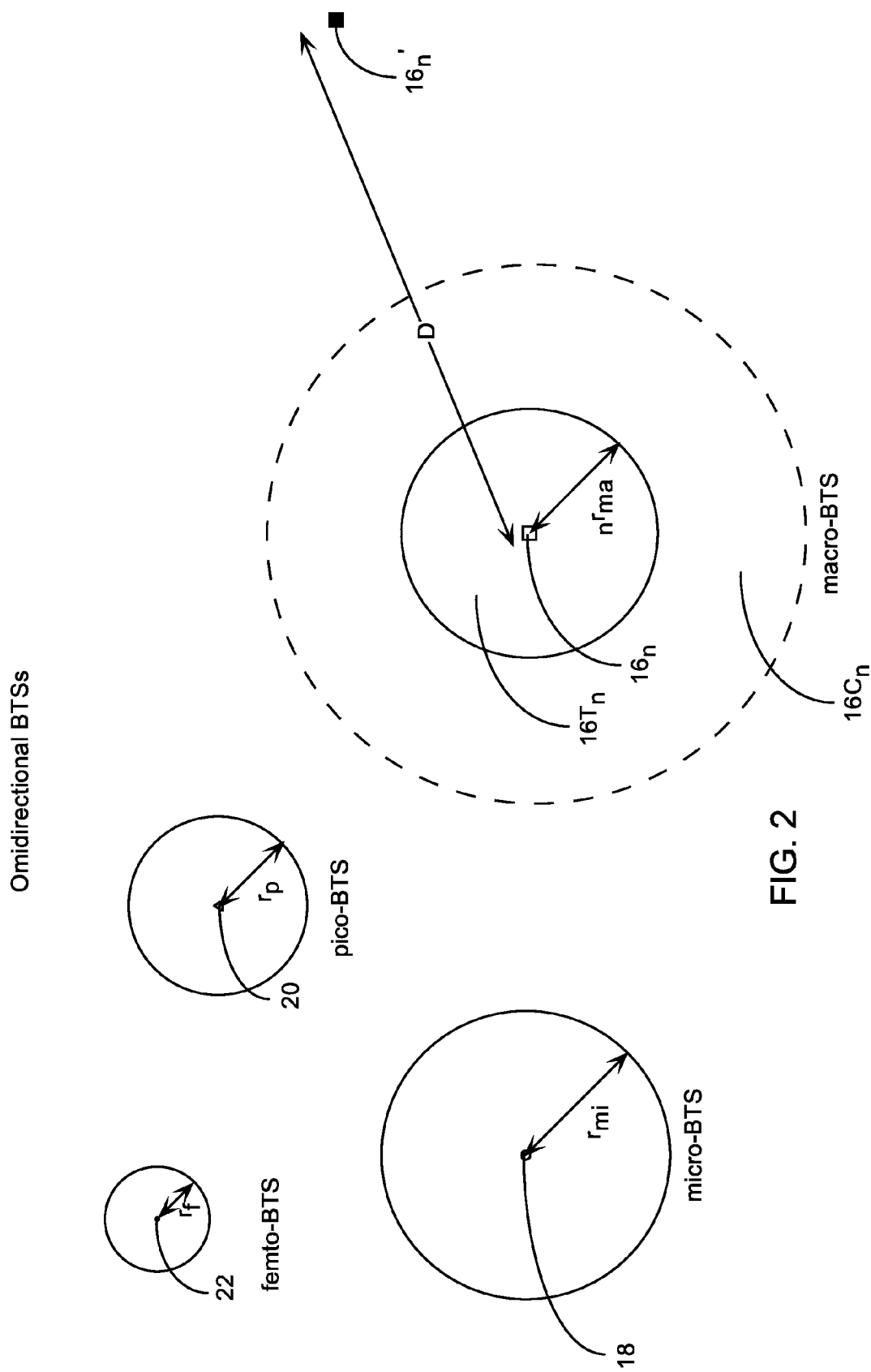
FIG. 2 is a schematic diagram of an omnidirectional category of Base Transceiver Stations (BTSs), according to an embodiment of the present disclosure.

FIG. 2 is a schematic diagram of the omnidirectional category of BTSs, according to an embodiment of the present disclosure. In a disclosed embodiment, each femto-, pico-, and micro-BTS in the omnidirectional category is assigned a circular expected terminal operating region, centered on the antenna system of the BTS, corresponding to the coverage region for that BTS. In the disclosed embodiment, an operator of system 10 may preset the radii of the circular regions for a femto-BTS ($r_f$), a pico-BTS ($r_p$), and a micro-BTS ($r_{mi}$) according to the maximum operating distances given above, i.e., $r_f$=12 m, $r_p$=25 m. and $r_{mi}$=50 m. However any other appropriate values for the radii may also be used.

For each omnidirectional macro-BTS $16_n$, processor 30 determines a respective radius $_n r_{ma}$ for the expected terminal operating region of each such BTS. Radius $_n r_{ma}$ is, unlike the radii of the other omnidirectional BTSs, not a preset numerical value, and the determination of $_n r_{ma}$ depends on the distance from BTS $16_n$ to a composite virtual macro-BTS $16_n'$. The determination of the distance to the composite virtual macro-BTS $16_n'$ is described below.

Typically, the values of radius $_n r_{ma}$ for the different macro-BTSs $16_n$ are different for each macro-BTS $16_n$. In addition, and in contrast to the other omnidirectional BTSs, typically, the coverage region of an omnidirectional macro-BTS does not correspond to the expected terminal operating region of the BTS. Rather, for omnidirectional macro-BTSs having a composite virtual macro-BTS, the expected terminal operating region of the BTS is a sub-region comprised in the coverage region of the omnidirectional BTS.

Figure 3:
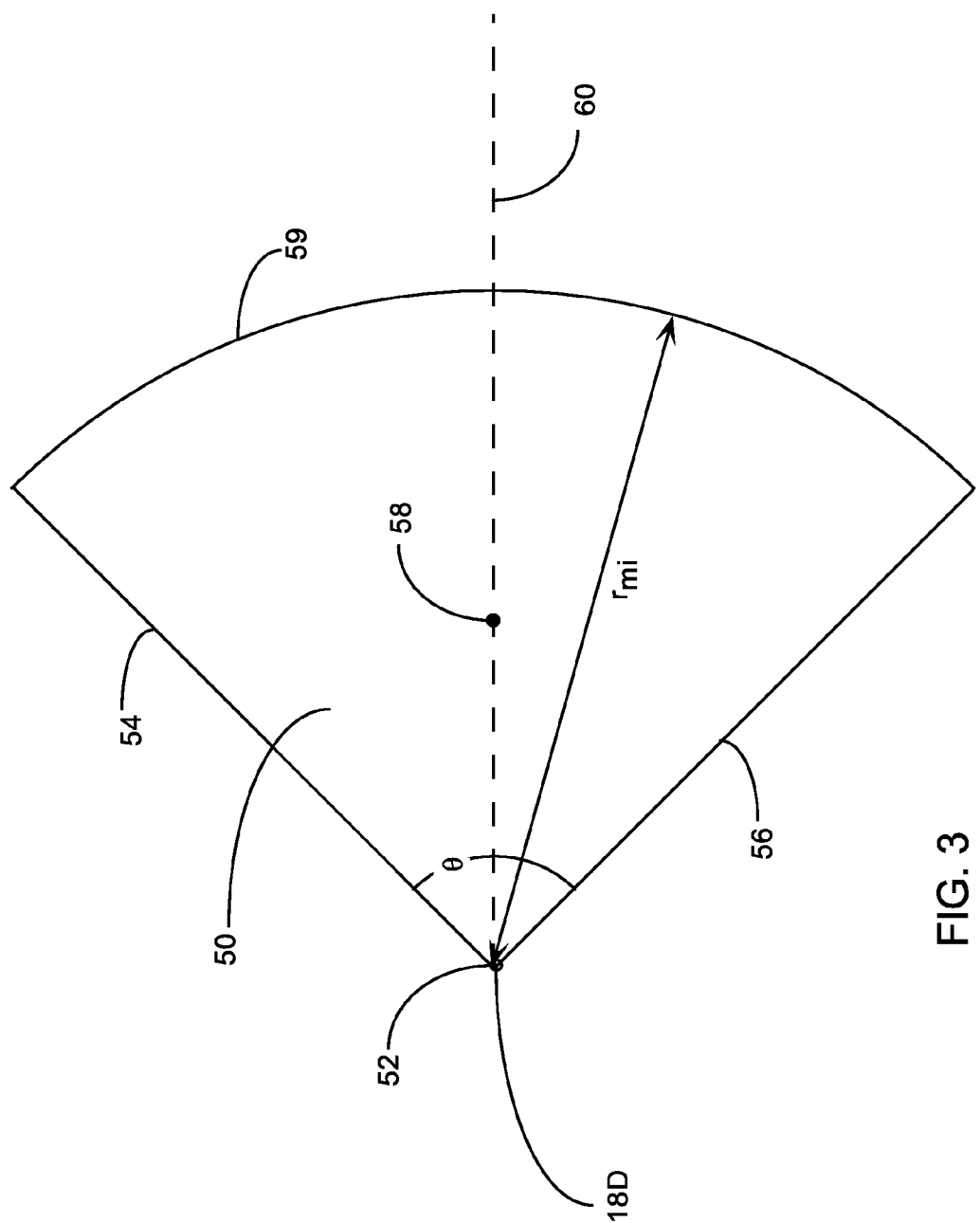
FIG. 3 is a schematic diagram of a directional micro-BTS, according to an embodiment of the present disclosure.

FIG. 3 is a schematic diagram of a directional micro-BTS 18, according to an embodiment of the present disclosure. A directional micro-BTS 18 is herein, for clarity, termed BTS 18D. BTS 18D is assumed to have substantially the same maximum operating distance, $r_{mi}$, as omnidirectional micro-BTSs. However, in contrast to the omnidirectional BTSs, BTS 18D has a coverage region that is a sector 50 of a circle, rather than a complete circle. Sector 50 has for its apex 52 the physical location of the antenna system of BTS 18D, and the sector is defined by two bounding radii 54, 56 and a bounding arc 59. Bounding radii 54, 56 define an angle θ at apex 52, which is in the present example approximately 90°, but which may be any angle in the range 0°<θ<360°.

BTS 18D is in the second, directional, category of BTSs. Thus, unlike an omnidirectional micro-BTS 18, which has an effective location corresponding to its physical location, micro-BTS 18D is assumed to have an effective location different from its physical location. The effective location of micro-BTS 18D is assumed to be a virtual location 58.

The most probable region of operation of a mobile terminal communicating with micro-BTS 18D is on or close to a bisector 60 of sector 50, since, as the mobile approaches the radii defining sector 50, the probability of the mobile communicating with another BTS, outside the sector, increases. Similarly, as the mobile approaches bounding arc 59, the probability of the mobile communicating with a BTS outside the sector increases, so that the most probable operating region for the mobile is away from the bounding arc.

To ensure that virtual location 58 corresponds to a region where there is a high probability for a mobile to be communicating with BTS 18D, virtual location 58 is assumed to lie on a bisector 60 of sector 50, and to be equidistant from apex 52 and bounding arc 59, i.e., to be a distance $$\frac{1}{2}r_{mi}$$

from the arc and the apex. However, virtual location 58 may be any other location within sector 50 that may correspond to a region where there is a high probability for a mobile to be in communication with BTS 18D, such as the centroid of sector 50.

Typically, the expected terminal operating region of BTS 18D is assumed to comprise the area covered by sector 50.

Figure 4:
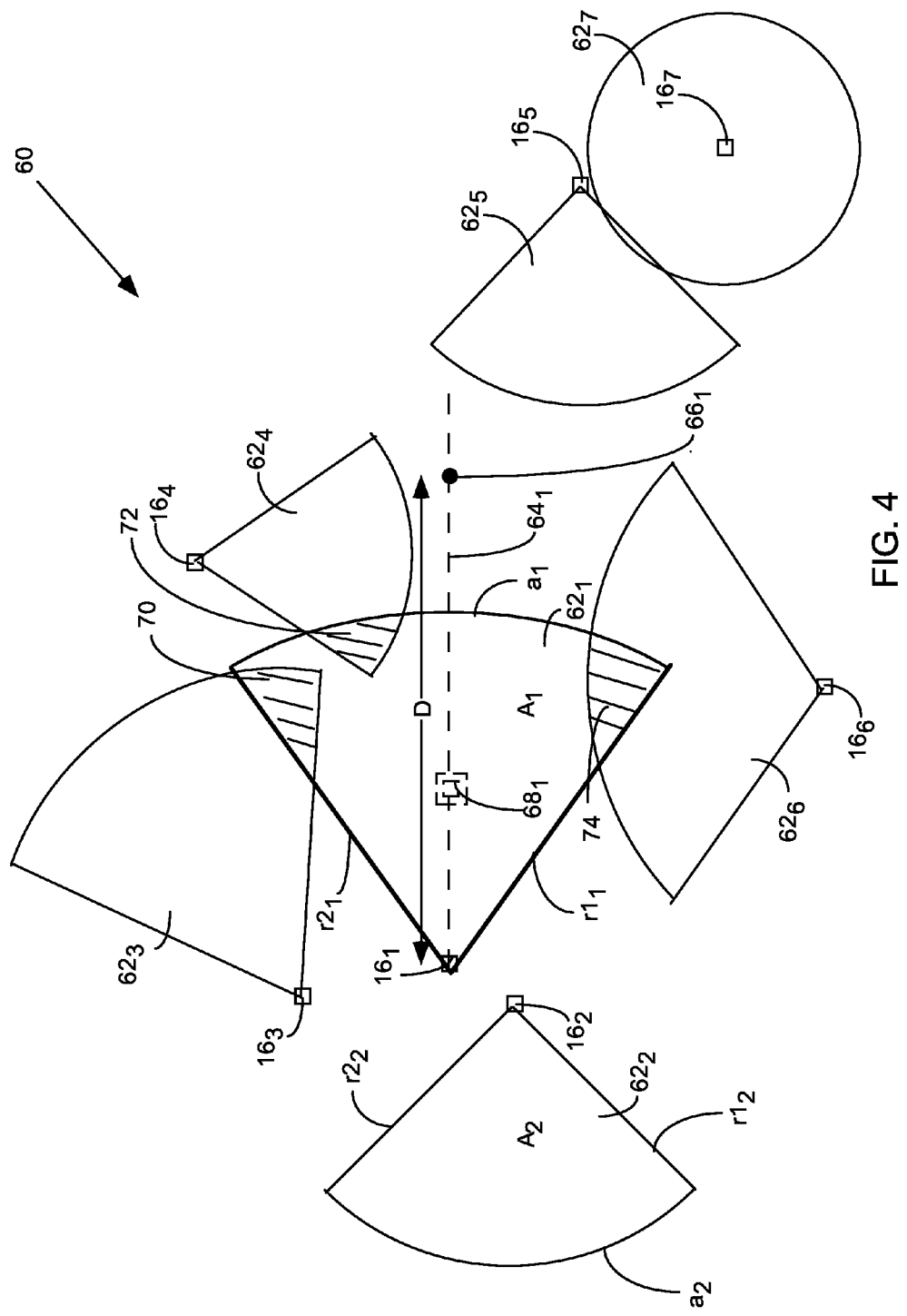
FIG. 4 is a schematic diagram of a region having macro-BTSs, according to an embodiment of the present disclosure.
Figure 5:
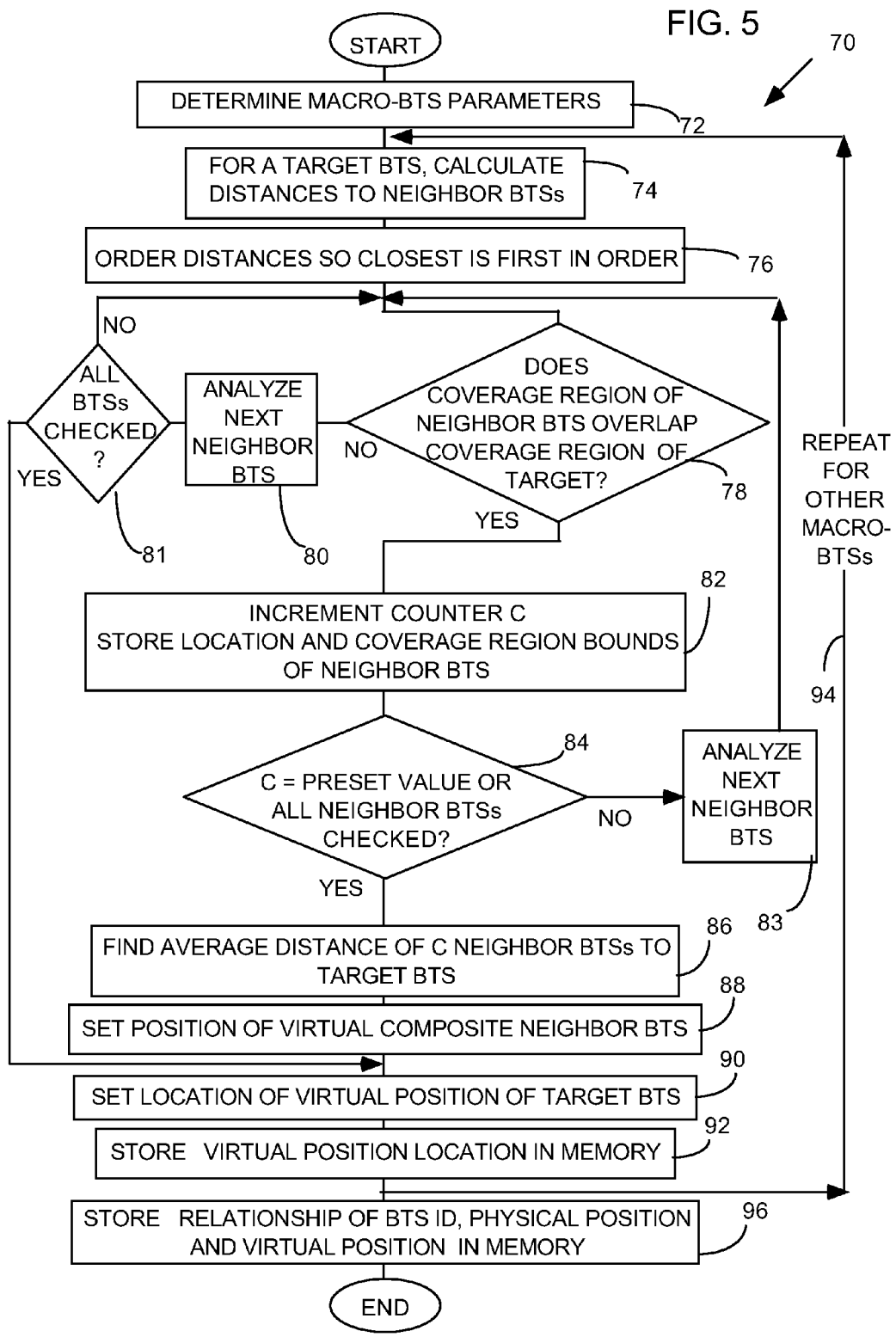
FIG. 5 is a flowchart showing steps for calculating the effective location of each of the directional macro-BTSs in the region of FIG. 4, according to an embodiment of the present disclosure.
Figure 6:
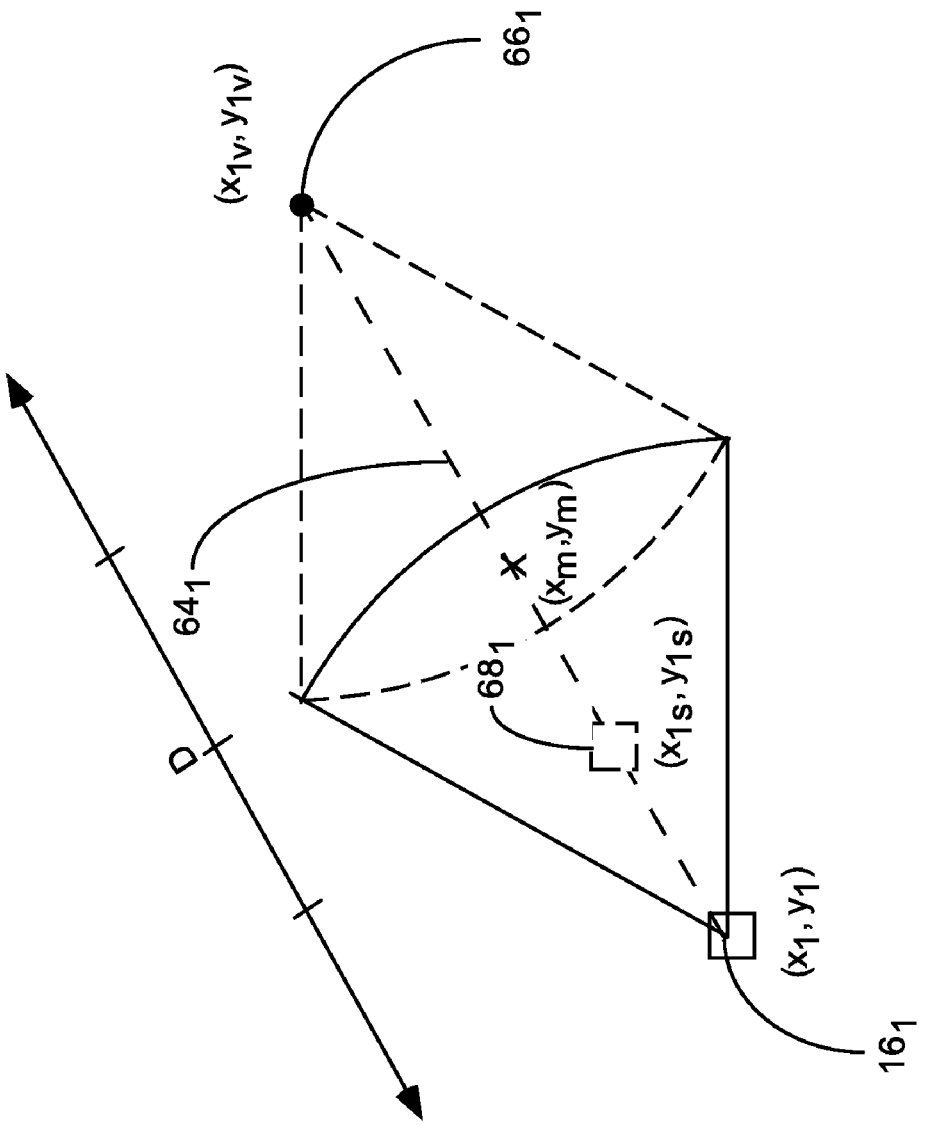
FIG. 6 is a schematic diagram illustrating a portion of the region of FIG. 4, according to embodiments of the present disclosure.

FIG. 4 is a schematic diagram of a region 60 having macro-BTSs 16, FIG. 5 is a flowchart 70 showing steps performed by processor 30 (FIG. 1) for calculating the effective location of each of the directional macro-BTSs in the region, and FIG. 6 is a schematic diagram illustrating a portion of region 60, according to embodiments of the present disclosure. Region 60 is, by way of example, assumed to be a sub-region of region 12 (FIG. 1), and although there may be other types of BTS and/or radiation coverage regions of other types of BTS in sub-region 60, only macro-BTSs 16 and their coverage regions are shown in FIG. 4, since typically the calculation performed by processor 30 only uses parameters of macro-BTSs. Each macro-BTS 16 is assumed to have a respective radiation coverage region 62, also referred to herein as region A, the coverage regions being differentiated as necessary by appending a corresponding subscript to the region numerical identifier or to "A." Thus BTS $16_i$ has a coverage region $62_i$ or $A_i$.

In an initial step 72 of flowchart 70, processor 30 determines the coordinates of the physical location, $(x_i, y_i)$, and the bounds of the coverage region $A_i$, i=1, ... N, of the antenna system of every macro-BTS $16_i$ in network 11, where N is the total number of macro-BTSs 16 operating in network 11. Processor 30 also obtains mean transmission power levels $p_i$ of every macro-BTS $16_i$. (Typically, in order to obtain the parameters for the macro-BTSs, the processor initially obtains the parameters for all categories of BTSs.)

By way of example, except where otherwise indicated, each directional macro-BTS 16 is assumed to have a coverage region in the shape of a sector. Thus, a specific coverage region is defined by bounds comprising two radii $r1_i$ and $r2_i$ and the arc $a_i$ connecting the two radii. For clarity in FIG. 4, only bounds of coverage regions $A_1$ and $A_2$ are labeled. However, it will be understood that embodiments of the present disclosure are not limited to coverage areas in the shape of sectors of a circle, and those having ordinary skill in the art will be able to adapt the description herein, mutatis mutandis, to include coverage area that have shapes, such as polygons or irregular figures, that are not sectors of a circle.

The determination of the physical locations and coverage regions of the N macro-BTSs, is typically by an operator of system 10 inputting necessary data into memory 32 of server 26 (FIG. 1). The operator of system may or may not be the operator of network 11. Alternatively or additionally, processor 30 may retrieve at least some of the required data for the physical locations and coverage regions of the N macro-BTSs substantially automatically, for example, from data stored in NSS 14. The processor stores the required data in memory 32.

In some embodiments, BTS parameters can be retrieved from a database of a service provider that operates network 11. Such data may comprise, for each BTS, the BTS type or class, geographical (two-or three-dimensional) coordinates of the physical BTS location, the direction (azimuth) at which the BTS antenna points, the maximum sector radius, the mean transmission power level of the BTS, and/or any other suitable parameter.

In step 72 processor 30 stores in memory 32 an initial value of a counter C as 0, and values of preset parameters q, r. The functions of parameters q, r are explained below.

In a first calculation step 74, for each specific directional macro-BTS 16, processor 30 determines the distances to neighboring macro-BTSs, typically macro-BTSs that are nearest-neighbors or next-nearest-neighbors. In the following explanation, the specific directional macro-BTS 16 being investigated is termed the target BTS, and the other macro-BTSs are termed neighbor BTSs. Target BTS 16 is assumed herein to be BTS $16_1$, having coordinates $(x_1, y_1)$, and a coverage area $A_1$. Referring to FIG. 4, in step 74 respective distances $d_2, \ldots, d_7$ from the target BTS to BTSs $16_2$, $16_3$, $16_4$, $16_5$, $16_6$, and $16_7$ are determined.

In an ordering step 76, after calculating the respective distances from the target macro-BTS to all the neighbor BTSs, processor 30 orders the neighbor BTSs according to their calculated distances to the target BTS, the closest neighbor BTS being first in the order. Table I below shows the order for the BTSs of FIG. 4:

TABLE I

| Neighbor BTS Identifier | Distance |
| --- | --- |
| $16_2$ | $d_2$ |
| $16_3$ | $d_3$ |
| $16_4$ | $d_4$ |
| $16_6$ | $d_6$ |
| $16_5$ | $d_5$ |
| $16_7$ | $d_7$ |

Starting from the first neighbor BTS in the order, in a first decision step 78 the processor checks if the coverage region of that neighbor BTS overlaps the coverage region of the target BTS. If overlap does not occur, the flowchart continues to a next neighbor step 80 and a decision step 81. If decision step 81 returns a negative answer, the processor analyzes the next neighbor BTS in the order by applying decision step 78 to the next neighbor BTS.

If overlap occurs so that decision step 78 returns a positive answer, in a step 82 the processor records the location of the neighbor BTS, records the bounds of the coverage region of the neighbor BTS, and also increments counter C. Counter C is a counter which records the number of neighbor BTSs that have coverage regions overlapping the target coverage region.

In a decision step 84, the processor checks if counter C equals a preset number q of neighbor BTSs, or if all neighbor BTSs have been analyzed in the previous steps. If decision step 84 returns a negative answer, the flowchart continues to a step 83, wherein a next neighbor BTS is analyzed in decision step 78.

In some embodiments, the preset value of q is 4.

If decision step 84 returns a positive answer, the processor continues to a second calculation step 86, where an average distance D is calculated. In some embodiments, the average distance is calculated according to equation (1a):

$$D = \frac{1}{C} \cdot \sum_{i=2}^{C+2} W_i \cdot \sqrt{(x_1 - x_i)^2 + (y_1 - y_i)^2} \quad C \geq 1 \tag{1a}$$

where
$(x_1, y_1)$ are the coordinates of the target BTS,
$(x_i, y_i)$ are the coordinates of neighbor $BTS_i$, and
$W_i$ is a weighting parameter assigned to neighbor $BTS_i$.

Typically, weighting factor $W_i$ is a measure of the mean transmission power level of the neighbor BTS compared with the total mean transmission power level available in the region of overlap. In one embodiment, equation (2) defines the weighting factor:

$$W_i = \frac{p_i}{p_1 + p_i} \tag{2}$$

where $p_1$ is the mean transmission power level of the target macro-BTS, and
$p_i$ is the mean transmission power level of neighbor macro-$BTS_i$.

In an alternative embodiment, weighting factor $W_i$ is a measure of the amount of overlap of coverage region $A_i$ with the target BTS coverage region $A_1$. In this alternative embodiment, equation (3) defines the weighting factor:

$$W_i = \frac{A_{overlap}}{A_1 + A_i} \tag{3}$$

where $A_{overlap}$ is the area of the overlap of the two coverage regions.

In a further alternative embodiment, weighting factor $W_i$ may be a composite function, such as a product of the expressions given in equations (2) and (3). Furthermore, the weighting factor may be formed using parameter types other than those exemplified above, i.e. mean transmission power levels and areas of coverage.

Such parameter types include, but are not limited to, capacities of the macro-BTSs.

Inspection of FIG. 4 shows that the BTSs to which equations (1a), (2) and (3) apply are BTSs 16₃, 16₄, and 16₆. The overlap of the two coverage regions, shaded in FIG. 4, are respectively overlap 70, 72, and 74.

In a BTS composite location step 88, the processor determines a position 66₁, having coordinates $(x_{1v}, y_{1v})$, of a virtual composite neighbor BTS as being distant D from $(x_1, y_1)$, located on a bisector 64₁ of the apex angle of sector $A_1$.

Returning to decision step 81, although typically rare, there may be cases wherein a macro-BTS 16 has no overlap with any other macro-BTS 16. In this case, after all neighboring macro-BTSs 16 have been checked, decision step 81 returns a positive answer, and counter C remains at 0, indicating that no neighboring macro-BTSs overlap the target macro-BTS. In other words, the macro-BTS is isolated. If such a macro-BTS 16 is omnidirectional, the virtual location of its antenna system may be assumed to correspond to the physical location of the antenna system. If the macro-BTS is directional, the virtual location may be assumed to be determined in a similar method as that for a directional micro-BTS 18, as described above with reference to FIG. 3.

In a position step 90, processor 30 calculates a virtual location 68₁ for target macro-BTS 16₁, according to the following criteria:

If target macro-BTS 16₁ is directional and has coverage regions overlapping at least one other macro-BTS (typically, the large majority of cases, wherein C≧1) the processor sets virtual location coordinates $(x_{1s}, y_{1s})$, of the target BTS as being on bisector 64₁, so that the virtual location $(x_{1s}, y_{1s})$ divides the line segment joining $(x_1, y_1)$ and $(x_{1v}, y_{1v})$ into a predetermined ratio 1:r, where r is a positive real number. FIG. 6, described below, illustrates this category of macro-BTS.

If target macro-BTS 16₁ is directional and isolated, so that C=0, the virtual location is set on the bisector 64₁ of the macro-BTS, at a distance $$\frac{1}{2} \cdot {}_1 r_{ma}$$

from macro-BTS 16₁ (i.e., at a similar position to that described above with regard to FIG. 3).

In this case, rather than equation (1a) for distance D applying, equation (1b) applies:

$$D = \frac{1}{2} \cdot {}_1 r_{ma} \quad C = 0 \tag{1b}$$

If target macro-BTS 16₁ is omnidirectional, the virtual location corresponds to the physical location of the macro-BTS.

FIG. 6 illustrates one embodiment wherein it is assumed that a coverage region of the virtual composite neighbor BTS mirrors the coverage region of the target BTS, so that at a midpoint X of bisector 64₁, having coordinates $(x_{1m}, y_{1m})$, there is an approximately equal probability of a mobile terminal communicating with the target BTS and with the virtual composite BTS.

Midpoint X has coordinates given by:

$$(x_{1m}, y_{1m}) = \left(\frac{x_1 + x_{1V}}{2}, \frac{y_1 + y_{1V}}{2}\right) \tag{4}$$

To ensure that the virtual location selected corresponds to a region wherein the mobile communicating with the target BTS has a high probability of operating, in this embodiment virtual location 68₁ is assumed to be equidistant between $(x_1, y_1)$ and $(x_m, y_m)$. Thus, the virtual location $(x_{1s}, y_{1s})$ is given by:

$$(x_{1s}, y_{1s}) = \left(\frac{x_1 + x_{1m}}{2}, \frac{y_1 + y_{1m}}{2}\right) \quad (5)$$

Substituting equation (4) into equation (5) gives:

$$(x_{1s}, y_{1s}) = \left(\frac{3x_1 + x_{1v}}{4}, \frac{3y_1 + y_{1v}}{4}\right) \quad (6)$$

It will be appreciated that in the embodiment described herein, $(x_{1s}, y_{1s})$ divides the line segment joining $(x_1, y_1)$ and $(x_{1v}, y_{1v})$ by the ratio 1:3, so that r=3.

Returning to flowchart 70, in a storage step 92, the processor stores the virtual location of the target BTS in memory 32.

As shown by line 94, the processor iterates steps 72-92 for all macro-BTSs in network 11. (In alternative embodiments, it is possible to apply the method of FIG. 5 to only a subset of the macro-BTSs, rather than to all BTSs in the network. For example, the method of FIG. 5 may be applied in a specified geographical area in which higher location accuracy is desired, e.g., in a dense urban area.)

In a final step 96, the processor stores, for all the macro-BTSs in network 11, a relationship or mapping between the identity of each macro BTS 16, the actual physical location of its antenna system, and the virtual location of the antenna system. By way of example, the relationship for the macro BTSs of FIG. 4 is shown as Table II:

TABLE II

| Macro BTS Identity | Physical Location | Virtual Location |
|---|---|---|
| $16_1$ | $(x_1, y_1)$ | $(x_{1s}, y_{1s})$ |
| ... | ... | ... |
| $16_6$ | $(x_6, y_6)$ | $(x_{6s}, y_{6s})$ |
| $16_7$ | $(x_7, y_7)$ | $(x_7, y_7)$ |

The description above provides a method for determining the virtual location of every BTS in network 11. The description with reference to FIGS. 2 and 3 provides a method for determining the expected terminal operating regions for all BTSs except macro-BTSs. The following description describes the determination of the expected terminal operating regions for macro-BTSs.

Figure 7:
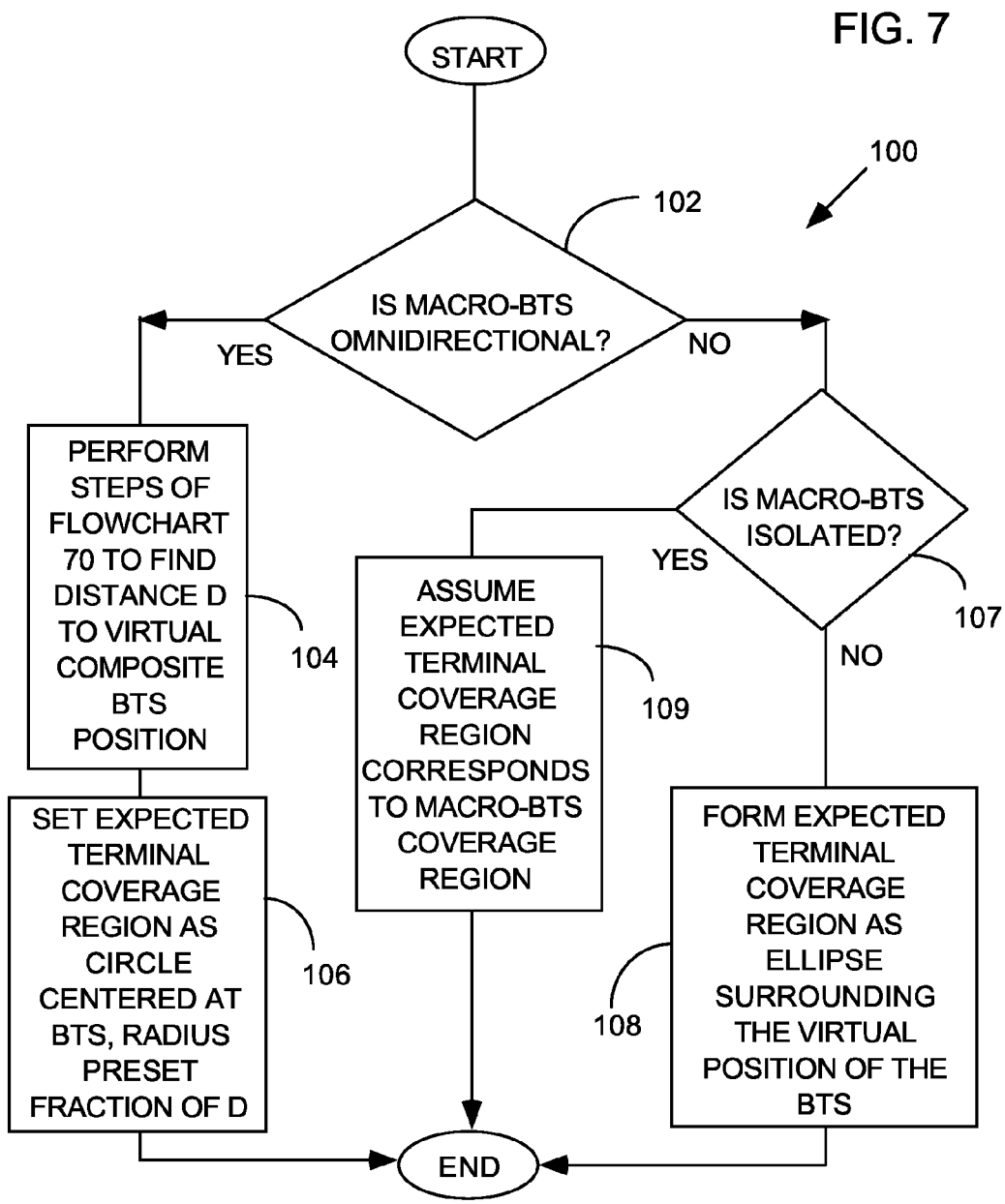
FIG. 7 is a flowchart of a procedure to determine expected terminal operating regions for macro-BTSs according to an embodiment of the present disclosure.
Figure 8:
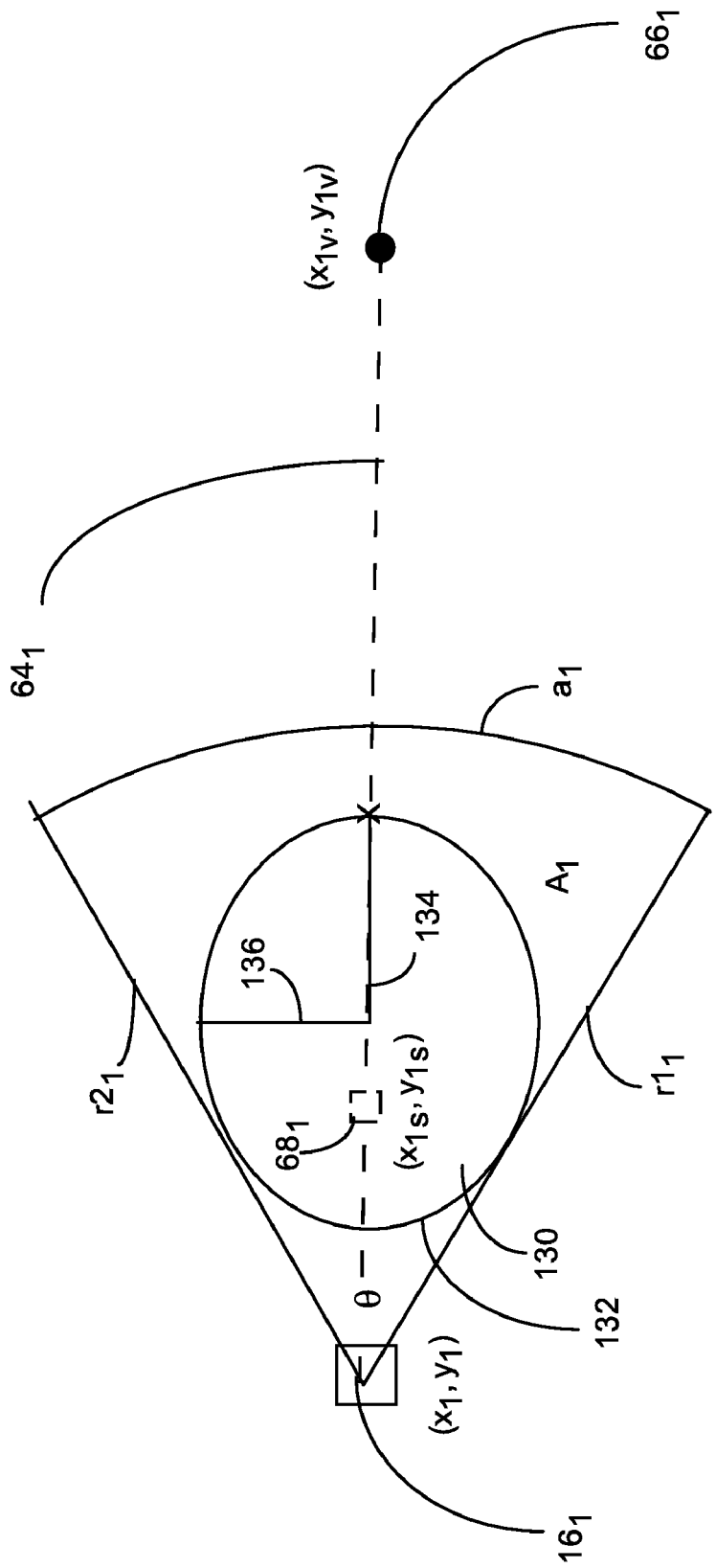
FIG. 8 is a diagram illustrating parameters of a directional macro-BTS, according to an embodiment of the present disclosure.

FIG. 7 is a flowchart 100 of a procedure to determine expected terminal operating regions for macro-BTSs, and FIG. 8 is a diagram illustrating parameters of a directional macro-BTS, according to an embodiment of the present disclosure. Processor 30 performs the procedure of flowchart 100 for every macro-BTS 16 in network 11, and stores the results of the procedure in memory 32.

In a decision step 102, the processor determines if the macro BTS is omnidirectional or directional.

If the macro-BTS is omnidirectional, the processor implements an omnidirectional step 104. In step 104, and referring back to FIG. 2 for the macro-BTS $16_n$ that is omnidirectional, processor 30 implements steps 72-86 of flowchart 70, in order to find a distance D between macro-BTS $16_n$ and the location of a virtual composite BTS $16_n'$. (Since macro-BTS $16_n$ is omnidirectional, there is no bisector upon which BTS $16_n'$ is positioned, so the location of BTS $16_n'$ illustrated in FIG. 2 may be anywhere on a circle radius D.)

In a step 106, a radius $_nr_{ma}$ is determined as a preset fraction of distance D. Typically, the fraction corresponds to the ratio 1:r described above for step 90.

The expected terminal coverage region of macro-BTS $16_n$ is set as a region $16T_n$ enclosed by a circle, centered at the physical location of the antenna system of macro-BTS $16_n$, radius $_nr_{ma}$. Region $16T_n$ is a sub-region of a coverage region $16C_n$ of macro-BTS $16_n$.

If the macro-BTS is directional, the processor continues to a decision step 107, to check if the macro-BTS is isolated. If the macro-BTS is isolated, in a step 109 the processor assumes that the expected terminal coverage region corresponds to the macro-BTS coverage region.

If decision step 107 returns a negative answer, the processor implements a directional step 108. As is illustrated in FIG. 8, which uses the same identifiers as FIGS. 4 and 6, in step 108 the terminal coverage region of macro-BTS $16_1$ is formed as a sub-region 130 of the complete coverage region $A_1$ of macro-BTS $16_1$. Typically, sub-region 130 is bounded by an ellipse 132.

In one embodiment ellipse 132 has a first axis 134 as a section of bisector $64_1$, and a second axis 136 perpendicular to the bisector. Typically, axes 134 and 136 are respectively semi-major and semi-minor axes of the ellipse. Alternatively, axes 134 and 136 are respectively semi-minor and semi-major axes of the ellipse. The ellipse intersects the bisector at X, and one of its foci is at virtual location $68_1$. In addition, ellipse 132 is formed so that bounding radii $r1_1$ and $r2_1$ are tangents to the ellipse.

In an alternative embodiment, ellipse 132 is centered on virtual location $68_1$. A length "a" of first axis 134 is set to be equal to the distance between the macro-BTS $16_1$ physical location and its virtual location $68_1$. A length "b" of second axis 134 is given by equation (6):

$$b = a\tan\frac{\theta}{2} \quad (6)$$

where $\theta$ is the angle between the two bounding radii of region $A_1$.

After completing steps 106, 107, or 108, flowchart 100 ends.

Figure 9:
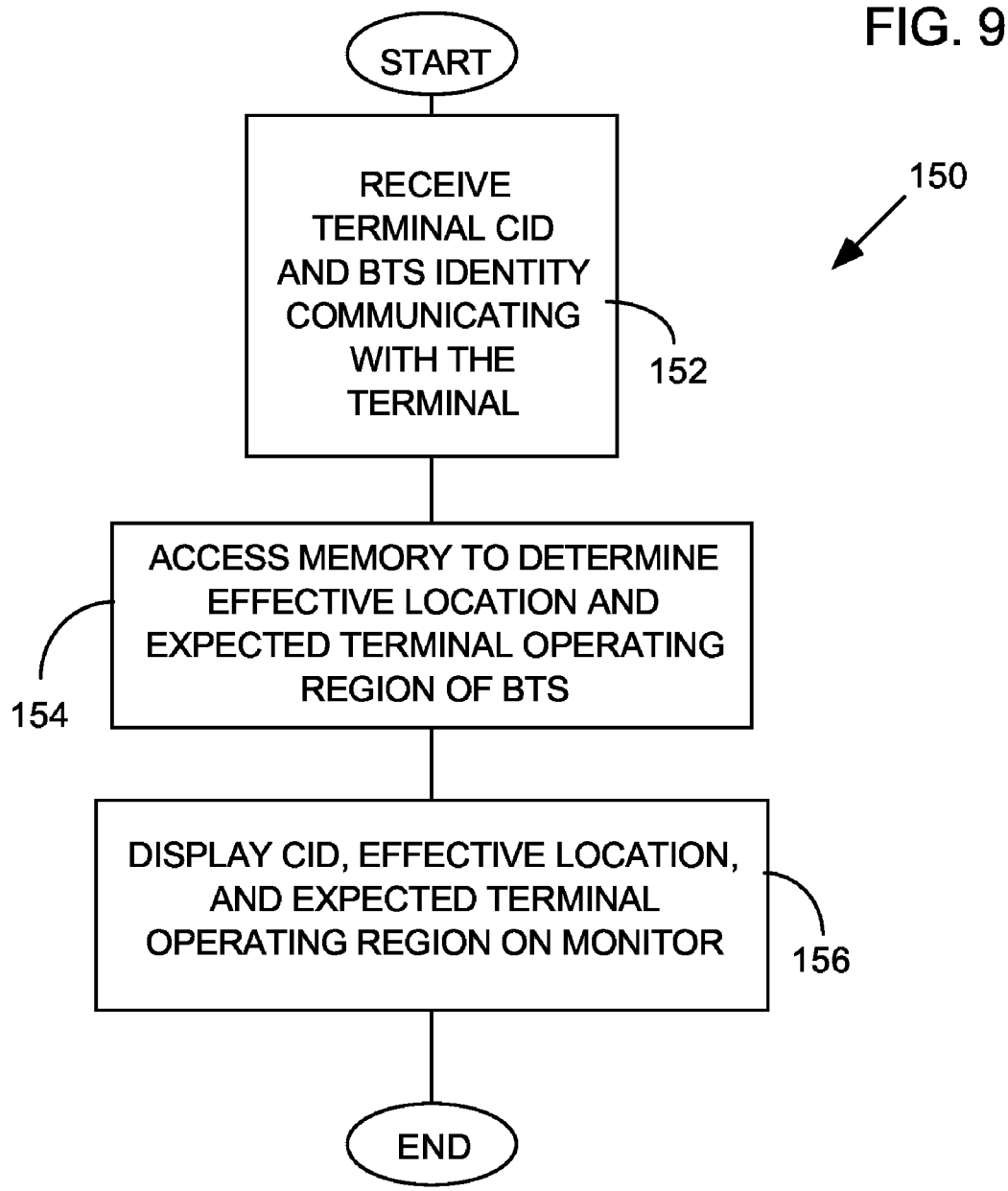
FIG. 9 is a flowchart of steps for displaying the location of a terminal operating in a network, according to an embodiment of the present disclosure.

FIG. 9 is a flowchart 150 of steps for determining and displaying the location of a terminal 24 operating in network 11, according to an embodiment of the present disclosure.

In a first step 152, processor 30 receives the CID record 44 (FIG. 1) of a particular terminal 24 which an operator of system 10 wants to locate. The record includes the identity of the serving BTS, i.e., the BTS with which the terminal is in communication.

In a second step 154, the processor accesses memory 32 to determine the effective location and the expected terminal operating region of the identified BTS.

In a final step 156, the CID, and the effective location and the terminal operating region of the serving BTS are displayed on monitor 38.

Flowchart 150 then ends.

The description above assumes that in network 11 each terminal 24 is in communication with only one BTS at a given time. Typically, for these networks, as terminal 24 moves within the network, there is a hard handover between BTSs communicating with the terminal.

As is known in the art, some networks, such as CDMA (Code Division Multiple Access) or UMTS (Universal Mobile Telecommunications System) networks, may allow each terminal to be in simultaneous communication with two or more BTSs in the network, in what is termed a soft handover. As is explained below, the scope of the present disclosure covers these types of networks. For simplicity, the following description assumes that only directional macro-BTSs 16 are involved in a soft handover. Those having ordinary skill in the art will be able to adapt the description, mutatis mutandis, to encompass omnidirectional macro-BTSs, as well as micro-BTSs, pico-BTSs, and femto-BTSs involved in a soft handover.

Figure 11:
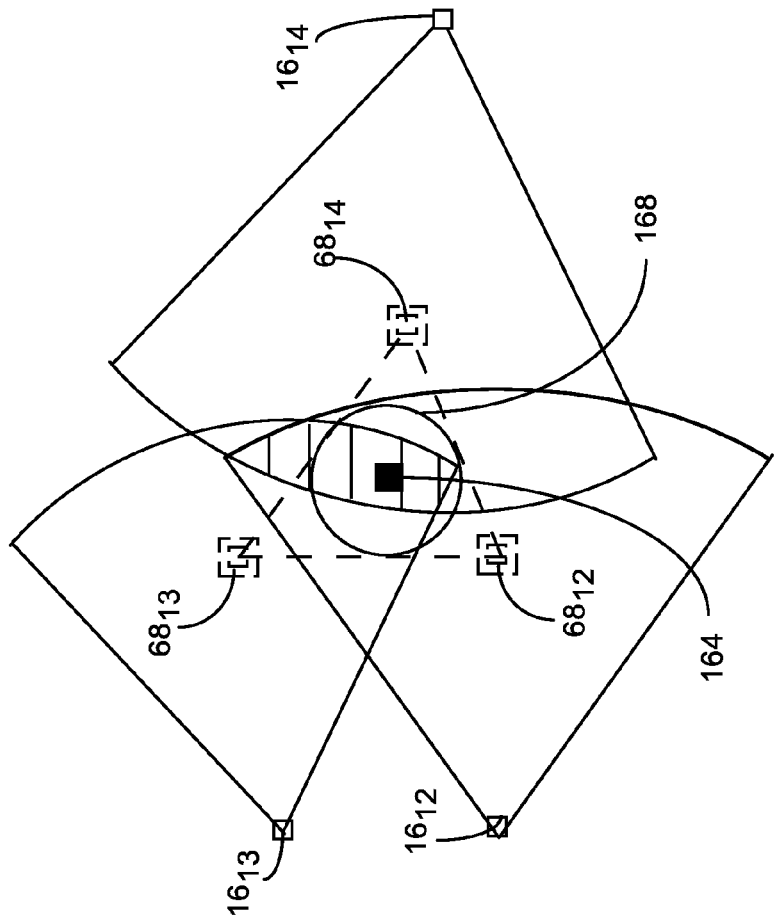
FIG. 11 is a schematic diagram illustrating three macro-BTSs, according to an embodiment of the present disclosure.
Figure 10:
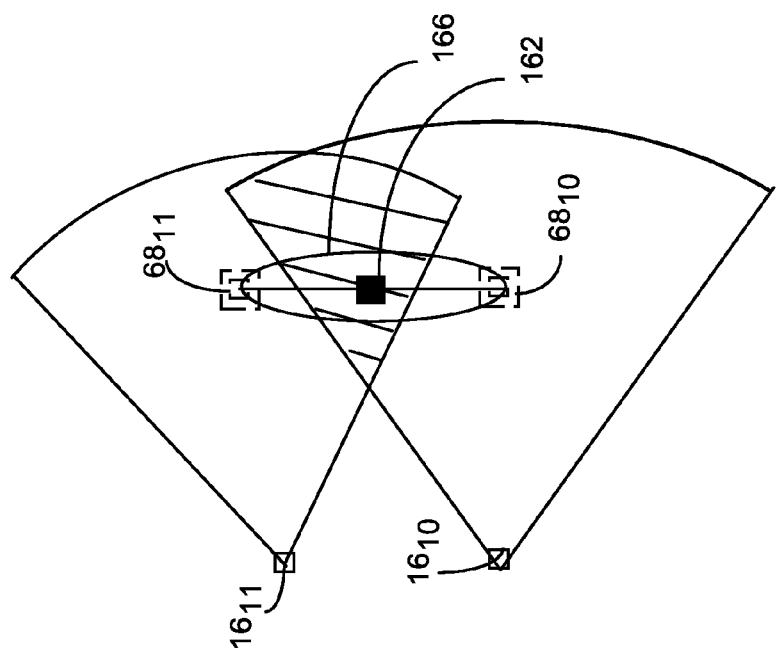
FIG. 10 is a schematic diagram illustrating two macro-BTSs, according to an embodiment of the present disclosure.

FIG. 10 is a schematic diagram illustrating two macro-BTSs $16_{10}$ and $16_{11}$, and FIG. 11 is a schematic diagram illustrating three macro-BTSs $16_{12}$, $16_{13}$, and $16_{14}$, according to an embodiment of the present disclosure. The macro-BTSs illustrated in FIGS. 10 and 11 are assumed to be operative in network 11 (FIG. 1), wherein soft handovers are possible.

Figure 12:
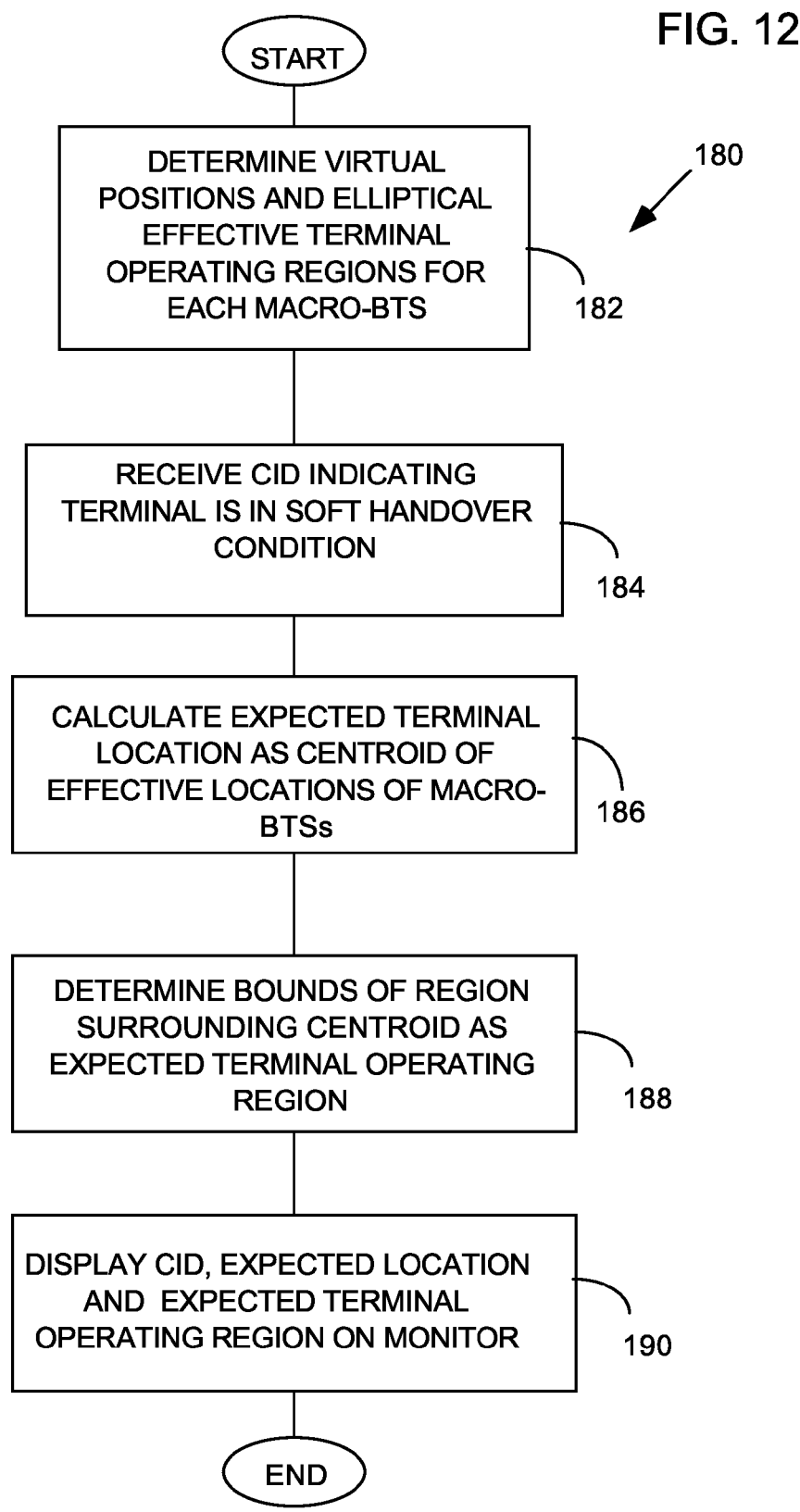
FIG. 12 is a flowchart of a procedure to find a location and an effective terminal operating region for a terminal during a soft handover, according to an embodiment of the present disclosure.

FIG. 12 is a flowchart 180 of a procedure followed by processor 30 to find a location and an effective terminal operating region for a terminal during a soft handover.

In a first step 182, the processor determines the virtual locations of each macro-BTS operating in network 11, substantially as described above for flowchart 70 (FIG. 5). The positions are shown as $68_{10}$, $68_{11}$, $68_{12}$, $68_{13}$, and $68_{14}$ in FIGS. 10 and 11. In addition, the processor determines the elliptical effective terminal operating regions for each macro-BTS operating in network 11, substantially as described above for flowchart 100 (FIG. 7). For clarity, the ellipses are not shown in FIGS. 10 and 11. (It will be understood that the virtual locations and effective terminal operating regions are determined as if each BTS is the sole BTS communicating with a terminal.)

In a CID receive step 184, the processor receives a CID indicating that a terminal 24 is in a soft handover condition, i.e., that the terminal is communicating with two or more BTSs in network 11 simultaneously.

In a terminal location step 186, the processor calculates an expected location of terminal 24 as a centroid of the effective locations of the BTSs with which the terminal is communicating. Thus, in FIG. 10, a terminal communicating with BTSs $16_{10}$ and $16_{11}$ has an expected location as a midpoint 162 of the line segment joining virtual locations $68_{10}$ and $68_{11}$. In FIG. 11, a terminal communicating with BTSs $16_{12}$, $16_{13}$, and $16_{14}$ has an expected location as a centroid 164 of the triangle having apexes $68_{12}$, $68_{13}$ and $68_{14}$. In some embodiments the calculation of the centroid may be weighted, for example according to the capacities or mean transmission power levels of the simultaneously communicating BTSs.

In a terminal operating region step 188, the processor determines the bounds of a region, surrounding the centroid determined in step 186, wherein the terminal is expected to operate.

For a soft handover wherein only two BTSs are involved, the expected region may be assumed to be a conic section in the form of an ellipse 166, centered on the centroid determined in step 186. In one embodiment, the ellipse may have a first axis as the distance from the centroid to one of the BTS virtual locations, and the second axis may be an average of the two axes determined for the BTSs in flowchart 100 according to equation (6).

For a soft handover wherein three or more BTSs are involved, the expected region may be assumed to be a conic section in the form of a circle 168, centered on the centroid determined in step 186. Typically, a radius of the circle is determined by having the circle tangential to the closest line segment formed by a polygon joining the three or more BTSs. It will be understood that in the case of a triangle, the circle touches all three line segments of the triangle. However, this will typically not be the case for polygons having more than three sides.

In a final step 190, the CID, and the expected location and the expected terminal operating region determined in steps 186 and 188, are displayed on monitor 38. Flowchart 180 then ends.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in a wireless communication network, determining respective distances between a given base transceiver station and one or more other base transceiver stations;
calculating, responsively to the distances, an effective location of the given base transceiver station that is different from a physical location of the given base transceiver station; and
reporting the effective location as an estimated location of a communication terminal communicating with the given base transceiver station,
wherein calculating the effective location comprises determining an average of the distances and calculating the effective location in response to the average, and
wherein the given base transceiver station is operative in a sector of a circle, and wherein calculating the effective location comprises determining a bisector of the sector and positioning the effective location to lie on the bisector.

2. The method according to claim 1, wherein the given base transceiver station is operative in a given coverage region, and wherein the one or more other base transceiver stations are operative in respective other coverage regions which at least partially overlap the given coverage region.

3. The method according to claim 1, wherein positioning the effective location comprises determining a position for the effective location in response to the average.

4. The method according to claim 1, wherein determining the average comprises weighting the average in response to respective parameters associated with the given base transceiver station and the one or more other base transceiver stations.

5. The method according to claim 4, wherein the respective parameters comprise a mean transmission power level.

6. The method according to claim 4, wherein the respective parameters comprise an amount of overlap between a given coverage region of the given base transceiver station and a coverage region of the one or more other base stations.

7. The method according to claim 1, wherein determining the average comprises progressively adding to the one or more other base transceiver stations until a preset number thereof is reached.

8. The method according to claim 1, wherein the wireless communication network only supports a hard handover of the communication terminal between the given base transceiver station and the one or more other base transceiver stations.

9. A method, comprising:
in a wireless communication network, determining respective distances between a given base transceiver station and one or more other base transceiver stations;

calculating, responsively to the distances, an effective location of the given base transceiver station that is different from a physical location of the given base transceiver station; and reporting the effective location as an estimated location of a communication terminal communicating with the given base transceiver station, wherein the given base transceiver station is operative in a coverage region, and comprising reporting an expected terminal operating region as a sub-region of the coverage region.

10. The method according to claim 9, wherein the sub-region comprises a conic section.

11. The method according to claim 10, wherein the coverage region comprises a sector having as bounds two radii of a circle, and wherein the conic section is tangential to the two radii.

12. A method, comprising:
in a wireless communication network, determining respective distances between a given base transceiver station and one or more other base transceiver stations;
calculating, responsively to the distances, an effective location of the given base transceiver station that is different from a physical location of the given base transceiver station; and
reporting the effective location as an estimated location of a communication terminal communicating with the given base transceiver station,
wherein the wireless communication network supports a soft handover of the communication terminal between the given base transceiver station and the one or more other base transceiver stations, and wherein the given base transceiver station comprises two or more base transceiver stations communicating simultaneously with the communication terminal, each of the two or more base transceiver stations having respective effective locations different from respective physical locations thereof, and comprising reporting the estimated location of the communication terminal as a function of the respective effective locations.

13. The method according to claim 12, wherein the function comprises a centroid of the respective effective locations.

14. The method according to claim 12, and comprising reporting an expected terminal operating region as a conic section enclosing the estimated location.

* * * * *